UNITED STATES PATENT OFFICE.

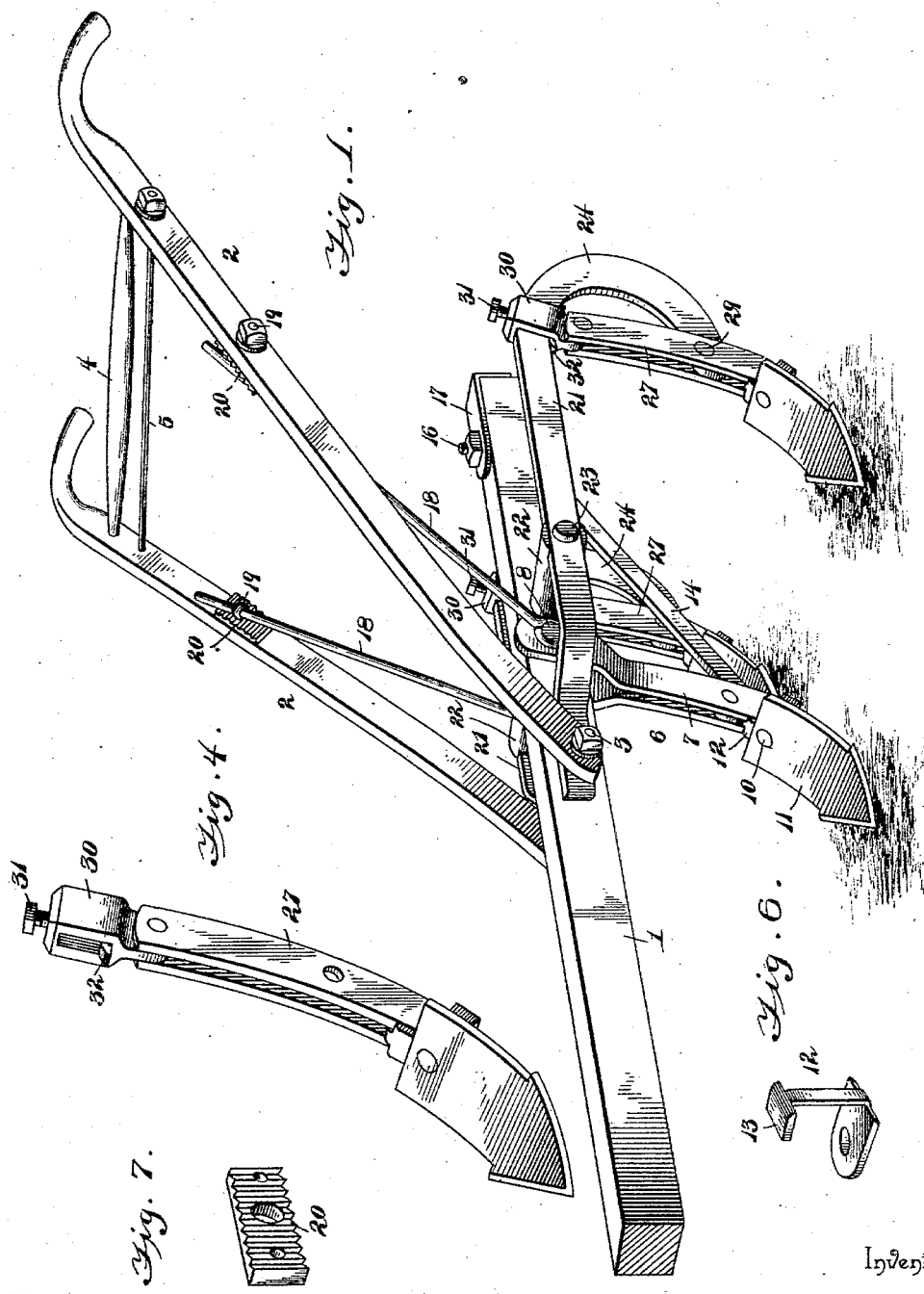

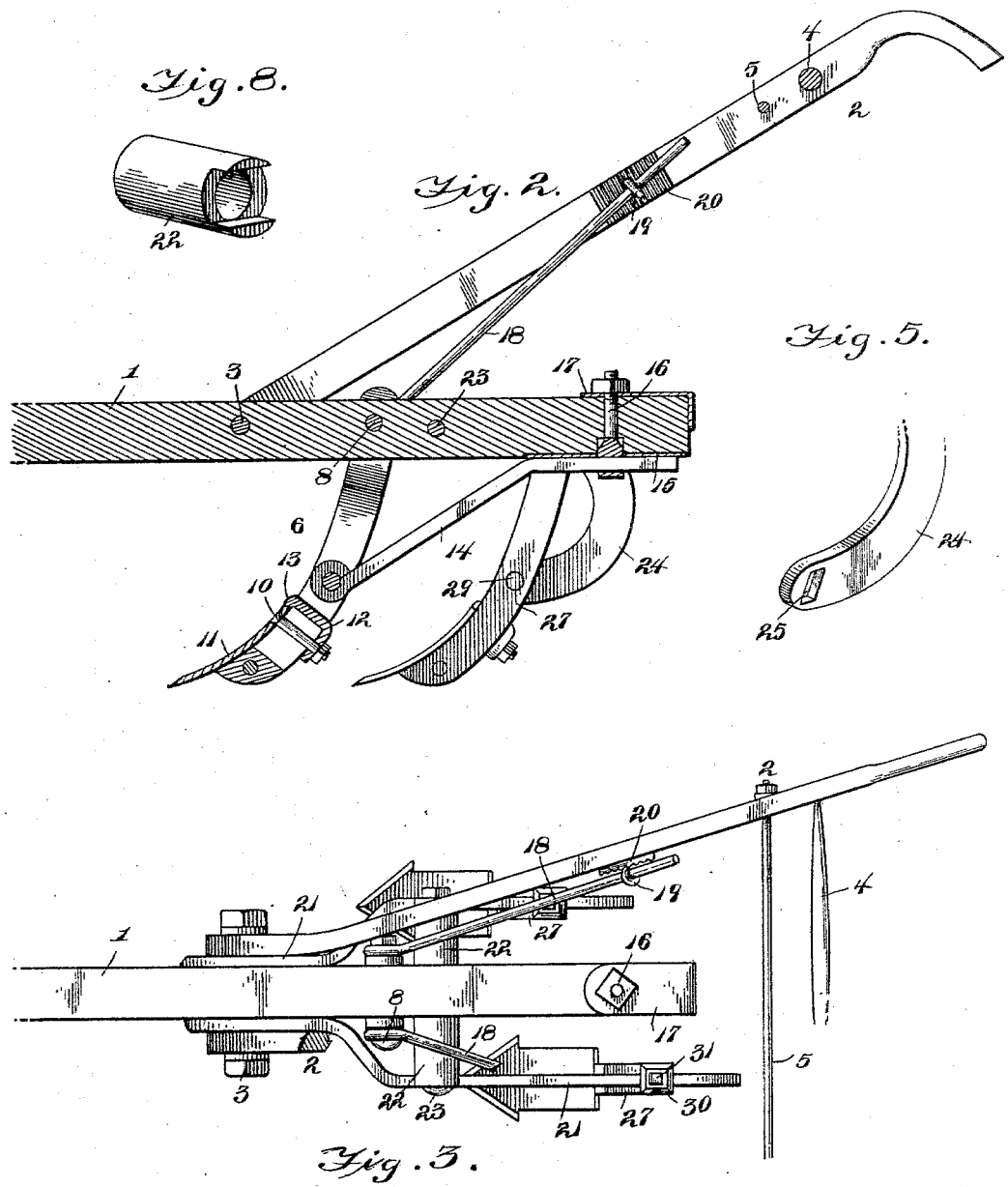

STERLING P. RICHMOND, OF BILLINGS, MISSOURI.

PLOW.

SPECIFICATION forming part of Letters Patent No. 571,688, dated November 17, 1896.

Application filed February 29, 1896. Serial No. 581,385. (No model.)

*To all whom it may concern:*

Be it known that I, STERLING P. RICHMOND, a citizen of the United States, residing at Billings, in the county of Christian and State of Missouri, have invented a new and useful Plow, of which the following is a specification.

This invention relates to an improvement in plows; and the object in view is to produce a simple and efficient plow which may be used either as a single or double plow or as a clod breaker and pulverizer, the several standards which comprise the plow being so mounted with relation to the beam that they may be adjusted, as to the angle, for regulating the depth to which the shovels enter the ground.

The invention also has for its object to provide novel means whereby the plow-handles may be raised and lowered to suit the requirements of the operator.

The invention consists in an improved plow embodying certain novel features and details of construction and arrangement of parts, as hereinafter fully described, illustrated in the drawings, and finally pointed out in the claims hereto appended.

In the accompanying drawings, Figure 1 is a perspective view of a plow constructed in accordance with the present invention. Fig. 2 is a vertical longitudinal section through the rear portion of the plow beam, &c. Fig. 3 is a plan view of the same with the plow-handles partly broken away. Fig. 4 is an enlarged detail perspective view of one of the rear standards and its adjusting-clip. Fig. 5 is a detail view of the lower extremity of one of the beam extensions. Fig. 6 is a detail perspective view of one of the shovel clips or holders. Fig. 7 is a detail view of one of the friction-plates for holding the handle-braces. Fig. 8 is a detail view of one of the spacing-sleeves of the beam extensions.

Similar numerals of reference designate corresponding parts in the several figures of the drawings.

Referring to the accompanying drawings, 1 designates the plow-beam, which in the present instance is constructed of hard wood and provided with suitable handles 2. The handles are pivotally connected at their forward extremities to the beam 1 by means of a transverse bolt 3 passing through such extremities and through the beam. From their pivotal point the handles diverge upwardly and rearwardly, being spaced apart by a horizontal strut 4 and firmly secured by a horizontal tie-bolt 5 or in any other convenient manner. Attached to the beam at a point between the pivotal connection of the handles and the rear end of the beam is a forward and central standard 6. This standard comprises twin side portions 7 of bar metal spread apart at their upper ends sufficiently to stride the beam and connected thereto by means of a transverse bolt 8. The lower ends of the parts 7 are united in any convenient manner, space being left, however, between said parts for a bolt 10, by means of which the shovel 11 is attached to the lower end of the standard.

A clip 12 is provided in connection with the shovel 11 for the purpose of holding the latter stationary and preventing the twisting thereof. This clip or holder comprises a reduced shank portion which passes between the parts 7 and a lower expanded end which lies against the rear edge of the standard and is perforated to receive the bolt 10. The clip 12 at its forward end is also expanded to form a transverse shoulder 13, which abuts against the upper edge of the shovel and prevents the same from twisting. The bolt 10, passing through the shovel and clip or holder, serves to lock both firmly in place. The standard 6 is adjusted as to its angle with relation to the beam by means of a rearwardly and upwardly inclined brace 14, the upper and rear portion of which is deflected into a horizontal plane and caused to lie beneath the beam 1 and bear against a wear-plate 15, attached to the lower edge of the beam or mortised into the same, as shown.

An eyebolt 16 passes vertically through the rear end of the beam and receives the brace 14 through its eye, the upper end of the bolt receiving an adjusting and tightening nut which is seated against a wear-plate 17, located upon the upper edge of the beam. The forward end of the brace 14 being pivotally connected to the forward standard by loosening the eyebolt 15 the brace is permitted to slide therethrough and the standard to be correspondingly adjusted as to its angle. When brought to the proper pitch, the eyebolt may be tightened and the standard so held.

A pair of handle-braces 18 are arranged upon opposite sides of the beam, the same being composed of stout rods or wires, the lower ends of which are pivotally received on the bolt 8, above referred to, passing through the standard, the upper ends of said braces being received through eyebolts 19, which pass transversely through the handles 2 of the plow. Serrated gripping or friction plates 20 are located upon the inner adjacent faces of the handles, being held in place by the eyebolts 19, which pass through them. By tightening the eyebolts 19 the handle-braces are caused to bite against the serrated faces referred to, and the longitudinal slipping of the braces is thus effectually prevented.

21 designates what may be termed a pair of "beam extensions," which are formed of metal and are in the shape of elongated bars or straps. These extension-pieces abut against the side faces of the beam at their forward ends and are secured by the pivotal bolt of the handles. A little in rear of such connection the extension-pieces are deflected laterally in opposite directions and then extended in parallel relation to the beam, or substantially so, and are spaced at the proper distance from the beam by means of spacing-collars 22, the outer ends of which are recessed to receive the extension-pieces 21. A through-bolt 23, passing entirely through the extension-pieces, spacing-sleeves, and beams, holds the structure rigid. The rear ends of the extension-pieces are given semicircular bends 24, so as to cause the extremities thereof to project forward, and each of said extremities is formed with a transverse slot 25 for a purpose that will appear.

Upon each of the extension-pieces 21 is pivotally mounted a standard 27. This standard is formed in a similar manner to the forward standard above described, comprising spaced bars connected at their lower ends and having a shovel connected thereto. This standard straddles the slotted end of its respective extension-piece and is connected thereto by means of a transverse bolt 29 passing through the standard and working in the slot 25.

30 designates a clip or sleeve which surrounds the extension-piece 21 and is capable of being held at any point thereon by means of a set-screw 31. At its under side the clip 30 is provided with a perforated ear which lies between the upper ends of the standard-bars and is pivotally connected thereto.

32 indicates a wedge or wear plate arranged within the opening of the clip for regulating the size of such opening to the extension-piece 21. By means of the construction just described the standard may be rocked upon its pivotal connection with the extension-piece, in which movement the clip 30 will slide upon said extension-piece, the slot in the end of the latter permitting the standard to rise and fall and thus allowing the clip to move partially around the U-shaped bend in the rear end of the extension-piece. When the desired adjustment is obtained, by tightening the set-screw 31, the standard may be held fixed.

From the foregoing description it will be seen that a very simple and efficient plow is obtained, which by omitting the central standard and shovel may be used as a double plow, or by omitting the side shovels may be used as a single plow; also that by employing all of the shovels the implement may be used as a clod breaker and pulverizer; also that by the various adjustments referred to the shovels may be set to penetrate the soil to any desired depth and the handles may be raised or lowered to suit the convenience of the operator.

It will also be apparent that various changes in the form, proportion, and minor details of construction may be resorted to without departing from the spirit or sacrificing any of the advantages of this invention.

Having thus described the invention, what is claimed as new is—

1. In a plow, the combination with the plow-beam, and the plow-handles pivotally connected directly thereto, of friction-plates arranged upon the inner adjacent faces of the handles and having transverse serrations or corrugations, a pair of handle-braces also having pivotal connection with the beam and extending across the serrations or corrugations of the friction-plates, and clamping-eyebolts passing through said handles and having the braces slidingly engaged thereby, whereby the braces may be clamped against said friction-plates, substantially in the manner and for the purpose described.

2. In a plow, the combination with the plow-beam, of a laterally-disposed beam extension-piece having its rear portion recurved or formed with a U-shaped bend and provided at its extremity with an oblique slot, a standard slidingly fulcrumed on such extremity and having its pivotal bolt or pin working in said slot, and a clip having pivotal connection with the standard and a sliding engagement with the extension-piece, substantially as described.

In testimony that I claim the foregoing as my own I have hereto affixed my signature in the presence of two witnesses.

STERLING P. RICHMOND.

Witnesses:
JOSEPH H. KOHRS,
D. D. GARNETT.